United States Patent
Elie-Dit-Cosaque et al.

(10) Patent No.: US 7,930,741 B2
(45) Date of Patent: Apr. 19, 2011

(54) SYSTEM AND METHOD FOR SECURING AN ETHERNET CONNECTIVITY FAULT MANAGEMENT (CFM) DOMAIN DEFINED ON A VLAN

(75) Inventors: David Elie-Dit-Cosaque, Richardson, TX (US); Kamakshi Sridhar, Plano, TX (US); Maarten Petrus Joseph Vissers, Huizen (NL); Jessy Rouyer, Ft. Worth, TX (US)

(73) Assignee: Alcatel Lucent, Paris (FR)

( * ) Notice: Subject to any disclaimer, the term of this patent is extended or adjusted under 35 U.S.C. 154(b) by 1403 days.

(21) Appl. No.: 11/221,276

(22) Filed: Sep. 6, 2005

(65) Prior Publication Data

US 2006/0056414 A1 Mar. 16, 2006

Related U.S. Application Data

(60) Provisional application No. 60/610,438, filed on Sep. 16, 2004.

(51) Int. Cl.
 G06F 11/00 (2006.01)
 G06F 12/14 (2006.01)
 G06F 12/16 (2006.01)
 G08B 23/00 (2006.01)
(52) U.S. Cl. ........................................................ 726/22
(58) Field of Classification Search .................... 726/22
 See application file for complete search history.

(56) References Cited

U.S. PATENT DOCUMENTS

| | | | | |
|---|---|---|---|---|
| 5,805,801 A * | 9/1998 | Holloway et al. | | 726/22 |
| 5,905,859 A * | 5/1999 | Holloway et al. | | 726/22 |
| 6,026,442 A * | 2/2000 | Lewis et al. | | 709/229 |
| 6,442,694 B1 * | 8/2002 | Bergman et al. | | 726/22 |
| 7,013,394 B1 * | 3/2006 | Lingafelt et al. | | 726/22 |
| 7,234,168 B2 * | 6/2007 | Gupta et al. | | 726/25 |
| 7,360,086 B1 * | 4/2008 | Tsuchiya et al. | | 713/168 |
| 7,394,758 B2 * | 7/2008 | Gonda | | 370/218 |
| 7,607,025 B1 * | 10/2009 | Trimberger | | 713/193 |
| 7,614,083 B2 * | 11/2009 | Khuti et al. | | 726/22 |
| 7,688,742 B2 * | 3/2010 | Sridhar et al. | | 370/241.1 |
| 2002/0176450 A1 * | 11/2002 | Kong et al. | | 370/539 |
| 2004/0017965 A1 * | 1/2004 | Abe | | 385/24 |
| 2004/0032868 A1 * | 2/2004 | Oda et al. | | 370/389 |
| 2005/0125692 A1 * | 6/2005 | Cox et al. | | 713/201 |
| 2005/0249124 A1 * | 11/2005 | Elie-Dit-Cosaque et al. | | 370/242 |

OTHER PUBLICATIONS

IEEE P802.1ag/D0.0, May 6, 2004.*
Mohan, D..; 802.1AG Connectivity Fault Management Tutorial; Nortel Networks Tutorial; Jul. 12, 2004.

(Continued)

*Primary Examiner* — Farid Homayounmehr
(74) *Attorney, Agent, or Firm* — Garlick Harrison & Markison

(57) ABSTRACT

A system and method for securing an Ethernet Connectivity Fault Management (CFM) domain defined on a Virtual Local Area Network (VLAN). In one embodiment, the scheme includes, responsive to registering by an external port with the VLAN, whereby the VLAN is extended to include the external port, monitoring by a boundary Maintenance End Point (MEP) node of the Ethernet CFM domain to determine if bidirectional control frame flow (e.g., Continuity Check (CC) frame flow) is observed threat; and, responsive to determining by the boundary MEP node that there is no bidirectional control frame flow therethrough, generating an alarm indicative of a potential breach of the Ethernet CFM domain by the external port.

24 Claims, 3 Drawing Sheets

OTHER PUBLICATIONS

IEEE LAN MAN Standards: Virtual Bridged Local Area Networks—Amendment 5: Connectivity Fault Management; IEEE P802.1AG/D0.0, [Online] May 6, 2004; Retrieved from the Internet: http://www.ieee802.org/1/files/private/ag-drafts/d0/802-1ag-D0-0.pdf.

Sridhar, Kamakshi et al.; "End-To-End Ethernet Connectivity Fault Management to Metro and Access Networks"; Alcatel; Technology White Paper; Jun. 2005; 14 pages.

* cited by examiner

SYSTEM AND METHOD FOR SECURING AN ETHERNET CONNECTIVITY FAULT MANAGEMENT (CFM) DOMAIN DEFINED ON A VLAN

PRIORITY UNDER 35 U.S.C. §119(e) & 37 C.F.R. §1.78

This nonprovisional application claims priority based upon the following prior U.S. provisional patent application(s): (i) "GVRP SECURED WITH OAM," Application No.: 60/610,438, filed Sep. 16, 2004, in the name(s) of: David Elie-Dit-Cosaque, Kamakshi Sridhar, Maarten Petrus Joseph Vissers and Jessy V. Rouyer; each of which is hereby incorporated by reference.

INCORPORATION BY REFERENCE OF RELATED APPLICATION(S)

This application discloses subject matter related to the subject matter disclosed in the following commonly owned co-pending patent application(s): (i) "SYSTEM AND METHOD FOR REDUCING OAM FRAME LEAKAGE IN AN ETHERNET OAM DOMAIN," application Ser. No. 11/021,642, filed Dec. 22, 2004, in the name(s) of: David Elie-Dit-Cosaque, Kamakshi Sridhar, Maarten Vissers and Tony Van Kerckhove; and (ii) "DOMAIN CONFIGURATION IN AN ETHERNET OAM NETWORK HAVING MULTIPLE LEVELS," application Ser. No. 11/023,716, filed Dec. 28, 2004, in the name(s) of: David Elie-Dit-Cosaque, Kamakshi Sridhar, Maarten Vissers and Tony Van Kerckhove, which is (are) hereby incorporated by reference.

BACKGROUND OF THE INVENTION

1. Technical Field of the Invention

The present invention generally relates to Ethernet VLAN networks. More particularly, and not by way of any limitation, the present invention is directed to a system and method for securing a VLAN using Ethernet Connectivity Fault Management (CFM) functionality.

2. Description of Related Art

Current first/last mile access network solutions have significant shortcomings from subscribers' perspective, ranging from performance bottlenecks, fixed bandwidth provisioning, limited scalability, lack of flexibility and provisioning complexity to end-to-end quality of service (QoS) issues and a high cost structure. Application of robust, simple Ethernet technology in the first mile promises to revolutionize the access network as it did in the arena of enterprise networks where it started out as a local area network (LAN) transport technology that is used to communicate between computers and networks. As an access technology, Ethernet offers three significant advantages over legacy first mile technologies: (i) future-proof transport for data, video and voice applications; (ii) cost-effective infrastructure for data services; and (iii) simple, globally accepted standard that will ensure interoperability.

In order to adapt the Ethernet technology in a carrier-grade service environment, various standards are being developed that aim to provide advanced Operations, Administration and Management (OAM) capabilities (also referred to as Ethernet Connectivity and Fault Management or Ethernet CFM) across the entire network from one end to the other end. Since the end-to-end service network environment is typically comprised of a patchwork of diverse component networks (e.g., metro access networks and core networks using a variety of technologies) that may belong to different organizations, network operators and service providers, the Ethernet CFM plane is envisioned as a hierarchically layered domain space wherein specific CFM domains (or, synonymously OAM domains) are defined corresponding to the constituent network infrastructure and provisioning. In particular, two standards, IEEE 802.1ag and ITU-T (Question 3, Study Group 13), incorporated by reference herein, that are specifically concerned with end-to-end Ethernet CFM define a customer-level domain at the highest level of hierarchy, which comprises one or more provider domains (occupying an intermediate level), each of which in turn includes one or more operator domains disposed at a lower hierarchical level. By way of standardization, the CFM domain space may be partitioned into a number of levels, e.g., 8 levels, each domain corresponding to a particular level, wherein a domain is defined in terms of what are referred to as flow points. In the context of the IEEE 802 specification suite, the flow points are new entities contained in the Media Access Control (MAC) "interfaces" and "ports" as defined in related standards documentation. A port can implement multiple flow points of different types. A flow point at the edge of a CFM domain is called a "Maintenance End Point" or MEP. A flow point inside a domain and visible to an MEP is called a "Maintenance Intermediate Point" or MIP. Whereas MEP nodes are used by system administrators to initiate and monitor CFM activity (by issuing appropriate CFM frames), MIP nodes passively receive and respond to CFM flows initiated by MEP nodes.

A CFM domain having one or more MIP nodes may be bounded by a plurality of MEP nodes. In order that CFM frame flows are appropriately filtered so that they are processed only by the intended domain's nodes, the MEP/MIP population of an Ethernet CFM network is configured appropriately. For instance, in accordance with the current standards, an integer value may be provided to indicate a specific domain level of an Ethernet CFM hierarchy.

Moreover, standards are also being specified to enhance service delivery technologies, which allow provisioning of Virtual LANs (VLANs) on top of a Data Link Layer (i.e., Layer-2 or L2) Ethernet network for adding flexibility, scalability and security to the CFM network. VLANs may be defined on different levels, e.g., customer-level, provider-level, etc., and can include any number of non-intersecting CFM domains. Service frame fields preceded with a "C-", e.g., C-VLAN ID, refers to customer-created fields. Likewise, service frame fields preceded with a "P-" (e.g., P-VLAN ID), refer to provider-added fields. By implementing VLANs, an end-to-end Ethernet CFM network may be partitioned into a number of service instances while preserving multiple subscribers' C-VLANs, wherein the traffic in a given VLAN is invisible to end hosts belonging to a different VLAN, thus reducing the broadcast domain.

Where VLANs are used, appropriate hardware (i.e., switches and associated ports) needs to be properly configured so as to delineate boundaries of VLAN coverage. As is well known, a VLAN is a network that is logically segmented, thereby eliminating the need to reconfigure switches when the end stations are moved. Each end station connected to an Ethernet is assigned a unique MAC address configured into the physical interface hardware such as a port or network interface unit, wherein an individual VLAN is mapped to a group of MAC addresses that comprise its domain.

Known techniques such as automatic configuration of VLANs and sharing of VLAN configuration information provide a number of benefits, e.g., plug-and-play functionality, uniformity of VLAN identifiers or VIDs, etc. However, such capabilities can expose an Ethernet CFM domain to potential security leaks since an external port disposed outside the VLAN domain can simply register the VID of a VLAN it wants to attack and join the network for gaining unauthorized access.

SUMMARY OF THE INVENTION

In one aspect, the present invention is directed to a method for securing an Ethernet CFM/OAM domain defined on a VLAN, comprising: responsive to registering by an external port with the VLAN, whereby the VLAN is extended to include the external port, monitoring by a boundary MEP node of the Ethernet CFM domain to determine if bidirectional control frame flow, e.g., Continuity Check (CC) frame flow, is observed thereat; and responsive to determining by the boundary MEP node that there is no bidirectional control frame flow therethrough, generating an alarm indicative of a potential breach of the Ethernet CFM domain by the external port.

In another aspect, the present invention is directed to a system for securing an Ethernet CFM domain defined on a VLAN, comprising: means associated with a boundary MEP node of the Ethernet CFM domain, the means operating responsive to registering by an external port with the VLAN whereby the VLAN is extended to include the external port, the means operable for monitoring frame flow through the boundary MEP node in order to determine if bidirectional control frame flow is observed thereat; and means, responsive to determining that there is no bidirectional control frame flow through the boundary MEP node, for generating an alarm indicative of a potential breach of the Ethernet CFM domain by the external port.

In yet another aspect, the present invention is directed to a network node operable in an Ethernet CFM domain defined on a VLAN, comprising: a structure, operable responsive to registering by an external port with the VLAN whereby the VLAN is extended to include the external port, for determining if bidirectional control frame flow is observed at the network node; and a structure, operable responsive to determining that there is no bidirectional control frame flow through the boundary MEP node, for generating an alarm indicative of a potential breach of the Ethernet CFM domain by the external port.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

DETAILED DESCRIPTION OF THE DRAWINGS

Figure 1:
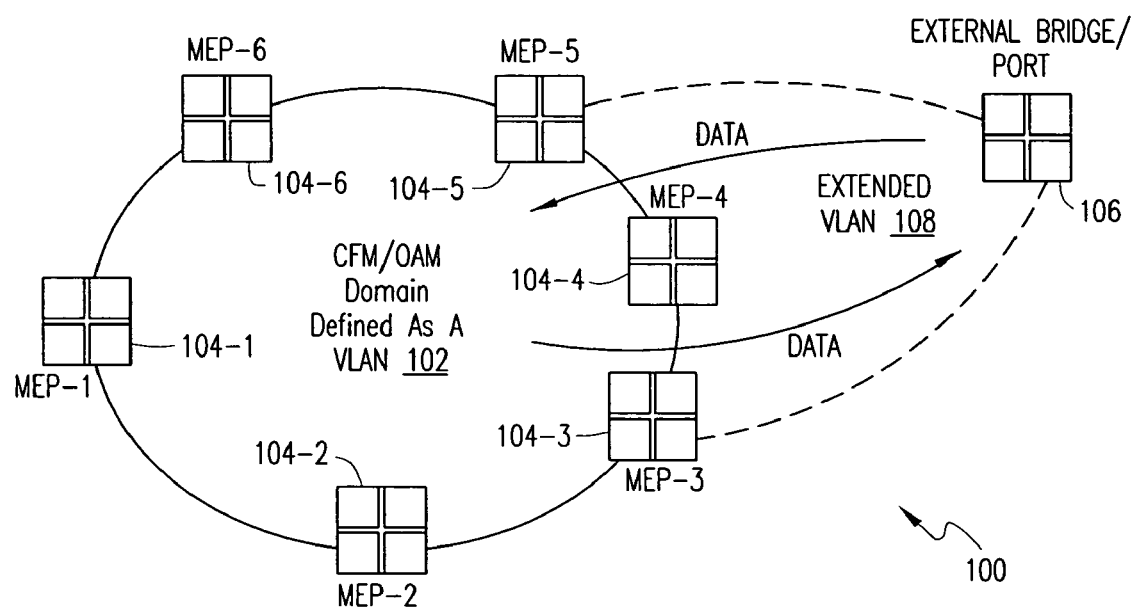
FIG. 1 depicts an exemplary Ethernet CFM domain as a VLAN arrangement wherein an embodiment of the present patent disclosure may be practiced.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary network arrangement 100 including a VLAN-based Ethernet CFM domain. A plurality of edge ports are configured as MEP nodes, e.g., MEP-1 104-1 through MEP-6 104-6, that bound the Ethernet CFM domain 102, which may be disposed at any level of the CFM hierarchical arrangement, e.g., as an operator-level, a customer-level, or a service provider-level domain. Additional details regarding implementation, operation and arrangement of an Ethernet CFM domain such as the CFM domain 102 as well as its constituent MIP and MEP nodes may be found in the following commonly owned co-pending patent application "SYSTEM AND METHOD FOR REDUCING OAM FRAME LEAKAGE IN AN ETHERNET OAM DOMAIN," application Ser. No. 11/021,642, filed Dec. 22, 2004, incorporated by reference in this patent disclosure.

According to one implementation of the Ethernet CFM domain 102, the MEP nodes 104-1 through 104-6 may be configured as a plurality of VLAN entities wherein the hierarchical level information is provided as an attribute value in the frames generated and transmitted according to Generic Attribute Registration Protocol (GARP). Accordingly, the plurality of network elements (i.e., end stations and bridges (or, synonymously, switches)) implementing the MEP ports of the Ethernet CFM domain 102 may include the functionality of a GARP state machine engine so as to facilitate domain configuration. Additional details regarding configuring an Ethernet domain using GARP may be found in the following commonly owned co-pending patent application "DOMAIN CONFIGURATION IN AN ETHERNET OAM NETWORK HAVING MULTIPLE LEVELS," application Ser. No. 11/023,716, filed Dec. 28, 2004, incorporated by reference as set forth hereinabove.

As is well known, VLAN membership (i.e., bridge ports deemed to be part of a single VLAN) can be statically configured by manual configuration or dynamically configured and distributed by means of GVRP or GARP VLAN Registration Protocol. GARP, which forms a part of the IEEE 802.1p extension to its 802.1d (Spanning Tree) specification, defines the architecture, rules of operation, state machines and variables for the registration and de-registration of attribute values. In general, a GARP participant in a bridge consists of a GARP application component and a GARP Information Declaration (GID) component associated with each port of the bridge. The propagation of information between GARP participants for the same application in a bridge is carried out by the GARP Information Propagation (GIP) component. Protocol exchanges take place between GARP participants by means of Logical Link Control (LLC) Type 1 services, using the group Media Access Control (MAC) address and protocol data unit (PDU) formats defined for the GARP application concerned.

GVRP, a GARP application defined in the IEEE 802.1p standard that allows for the control of 802.1q VLANs, provides for 802.1q compliant pruning and dynamic VLAN creation on 802.1q trunk ports. Also, with GVRP, a switch can exchange VLAN configuration information with other GVRP switches, prune unnecessary broadcast and unknown unicast traffic, and dynamically create and manage VLANs on switches connected through 802.1q ports. Whereas these capabilities can help reduce the chances for errors in configuration of a VLAN by automatically providing the VLAN's ID (VID) to all GVRP-aware switches that have registered with the network (thereby ensuring VID consistency across the network), it is possible that an external port can breach the security of an Ethernet CFM domain defined on the VLAN because of the inadvertent extension of the existing VLAN configuration.

Those skilled in the art should recognize that such extensions of existing VLAN configurations may also take place when using other related registration protocols such as, e.g., Multiple Registration Protocol (MRP) and Multiple VLAN Registration Protocol (MVRP). Accordingly, the teachings and embodiments set forth herein are applicable to VLANs based on GVRP as well as MRP/MVRP configurations, *mutatis mutandis*.

Continuing to refer to FIG. 1, reference numeral 106 refers to an external "rogue" bridge port that is originally not part of the coverage of Ethernet CFM VLAN 102 but is operable to join the VLAN by registering therewith using, e.g., a synthesized or counterfeit VID. Once the external port 106 joins the existing VLAN 102, the VLAN domain extends so as to include the newly added port, whereby the domain coverage is augmented by an extended VLAN portion 108 that may include other external ports (not shown). Since the external port 106 has now become part of the extended VLAN, it is operable to receive GVRP/MVRP advertisements issued from the legitimate VLAN ports including the MEP ports of the Ethernet CFM domain 102. Consequently, the external port 106 gains unauthorized access to the broadcast and multicast traffic (e.g., both data and control frames) associated with the CFM domain as alluded to in the Background section of the present patent disclosure.

Figure 2:
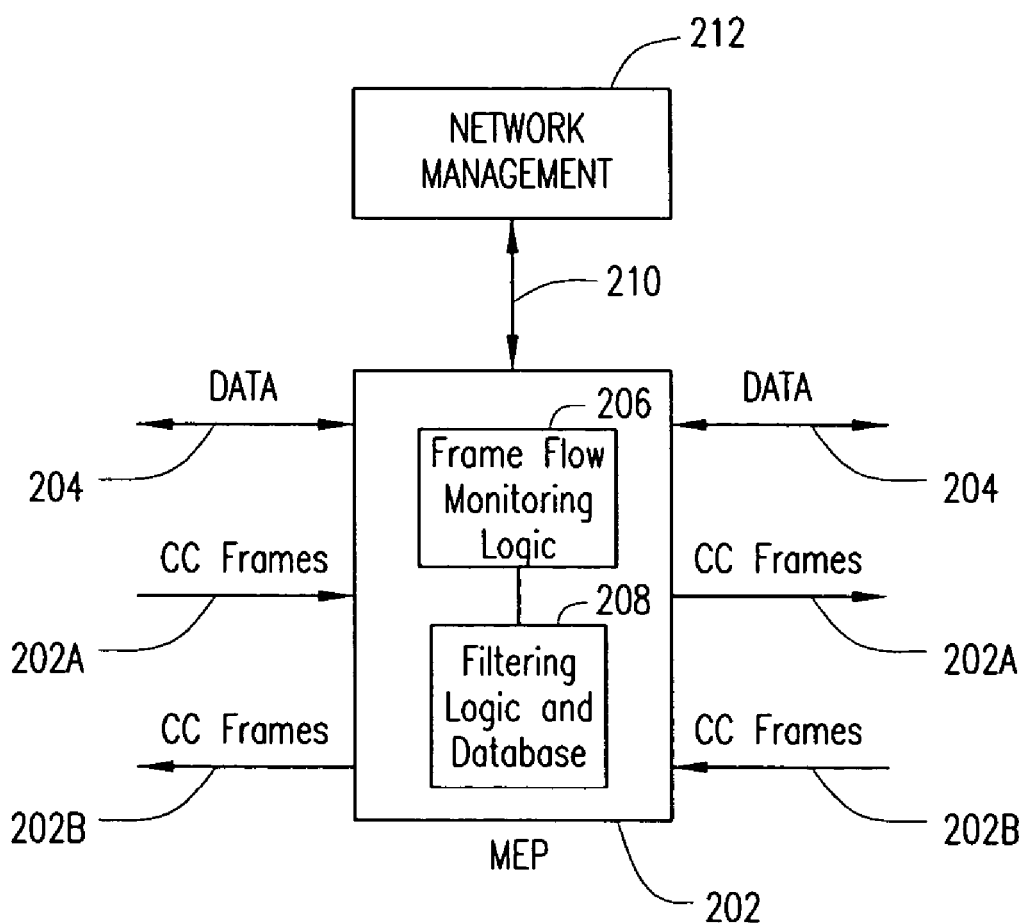
FIG. 2 depicts an exemplary MEP node operable in the Ethernet CFM domain shown in FIG. 1 in accordance with the teachings of the present invention.

FIG. 2 depicts an exemplary MEP node 202 operable in the Ethernet CFM domain 102 of FIG. 1 in accordance with the teachings of the present invention. In particular, the MEP node 202 is provided with appropriate logic for securing the Ethernet CFM domain 102 by coupling the CFM functionality and GVRP/MVRP when a new port is detected. As illustrated in FIG. 1, when the new external port 106 joins the existing VLAN, thereby extending its coverage, data may flow between the CFM domain 102 and the unauthorized VLAN extension 108 through a boundary MEP port such as MEP-4 104-4. Accordingly, a logic structure 206 is provided with MEP node 202, operable as MEP-4, that is responsive to detecting the presence of the external port 106 when it registers with the VLAN. The logic 206 is also operable to monitor the control frames (e.g., Continuity Check (CC) frames) flowing through the MEP in order to determine if there is bidirectional control frame flow, since a legitimate MEP node configured in a particular CFM domain is expected to receive control frames from other legitimate MEP nodes of the domain (in addition to generating the applicable control frames itself). Accordingly, the logic structure 206 is operable to determine whether there exist CC frames 202A from the CFM domain 102 towards the extended VLAN portion 108 (including the external port 106) as well as CC frames 202B from the extended VLAN portion 108 towards the CFM domain nodes. In one exemplary implementation, the frame flow monitoring logic may be configured to check for bidirectional flow of CC frames within a time period after a new port is detected, wherein the time period can be variable, fixed, predetermined, or configured otherwise.

Continuing to refer to FIG. 2, the monitoring logic 206 is interfaced with a data filtering/forwarding logic and database 208 of the MEP node 202 such that data frame flow is appropriately modulated based on determinations by the monitoring logic 206. In particular, the data frames are allowed to be forwarded by the MEP node to other destinations according to the filtering logic and database 208 only if bidirectional CC flow is observed at that node. Otherwise, the data frames are dropped by the MEP node. Moreover, as a further variation, the MEP node is operable to generate and send an alarm 210 to a network management node 212 associated with the CFM domain in which the node is disposed so as to notify the presence of a possible intruder. Accordingly, an illegal external port joining an existing VLAN is denied the opportunity to silently listen to the data traffic broadcast in the VLAN although it may still remain as part of the VLAN coverage. In addition, the external port is prevented from injecting potentially harmful traffic into the VLAN/CFM domain.

Figure 3:
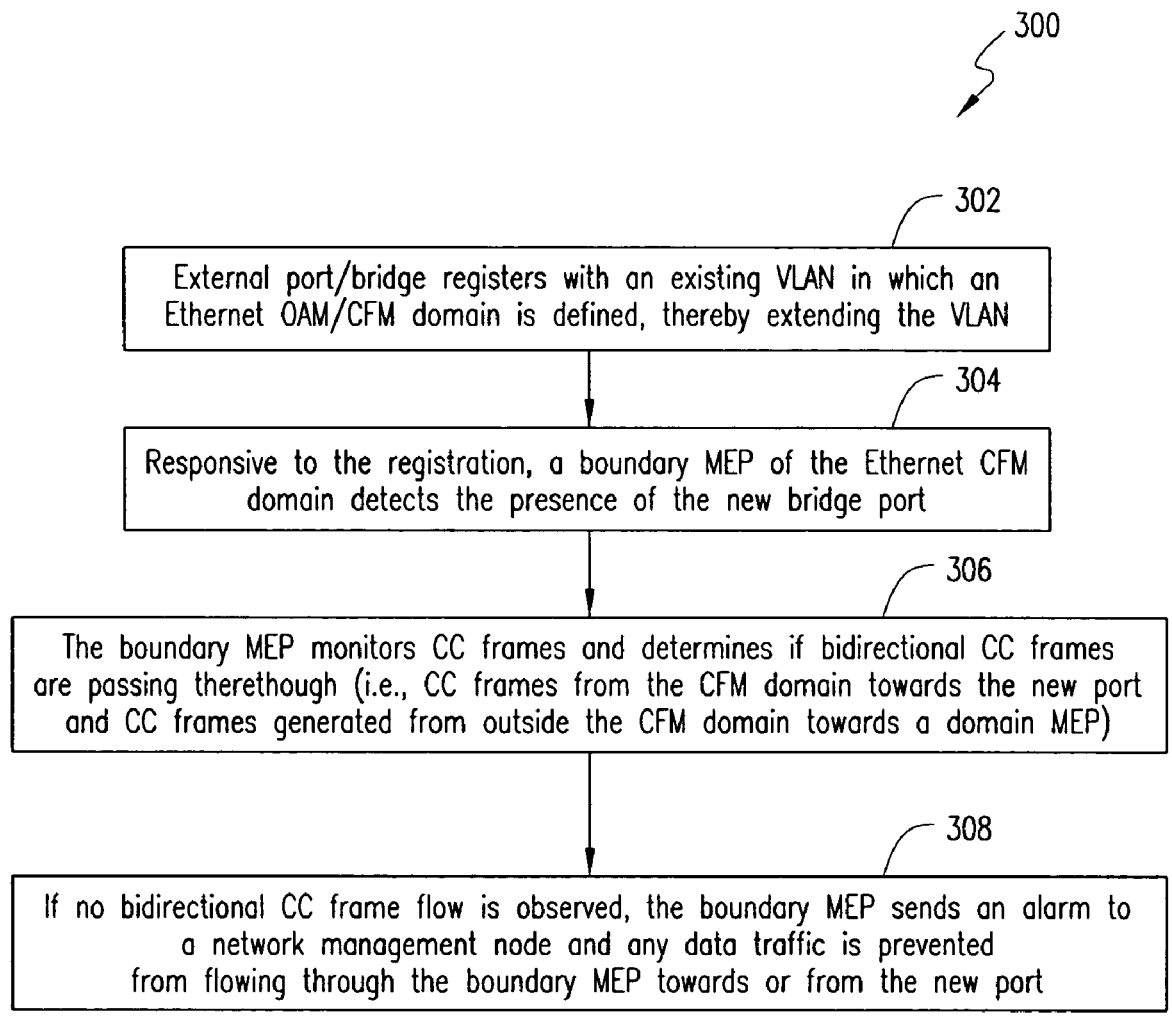
FIG. 3 depicts a scheme for securing a VLAN-based Ethernet CFM domain according to one embodiment of the present invention.

FIG. 3 depicts a scheme 300 for securing a VLAN-based Ethernet CFM domain according to one embodiment of the present invention. As explained hereinabove, an external port/bridge can register with an existing VLAN in which an Ethernet CFM domain may be defined, thereby extending the VLAN coverage (block 302). Responsive to the registration, which can be manual or automatic, a boundary MEP of the Ethernet CFM domain detects the presence of the new bridge port (block 304). Thereafter, the boundary MEP monitors control frame flow and determines if bidirectional control frames (e.g., CC frames) are passing therethrough (i.e., CC frames from the CFM domain towards the new port and CC frames generated from outside the CFM domain towards a domain MEP) (block 306). If no bidirectional flow is observed, the boundary MEP generates and transmits an alarm to a network management node that is indicative of a potential breach of the CFM domain by the newly added external port. Additionally, any bidirectional data traffic (i.e., data frames towards or from the external port) is prevented from flowing through the MEP node. These operations are exemplified in block 308.

Based on the foregoing Detailed Description, it should be appreciated that the present invention advantageously provides a simple, yet effective, scheme for detecting unauthorized access to a VLAN. Those skilled in the art should recognize that the methodology set forth herein can be practiced in an implementation involving software, hardware, or firmware, or any combinations thereof, associated with appropriate bridge equipment. Further, it should be appreciated that the teachings of the present invention do not necessarily require modifications with respect to applicable standards and protocols currently in use.

Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:

1. A method for securing an Ethernet Connectivity Fault Management (CFM) domain defined on a Virtual Local Area Network (VLAN), comprising:

responsive to registering by an external port with said VLAN, whereby said VLAN is extended to include said external port, monitoring by a boundary Maintenance End Point (MEP) node of said Ethernet CFM domain to determine if bidirectional control frame flow is observed thereat, wherein bidirectional control frame flow includes control frames transmitted from one or more nodes in the CFM domain to the external port and control frames transmitted from the external port to the one or more nodes in the CFM domain; and responsive to determining by said boundary MEP node that there is no bidirectional control frame flow therethrough, generating an alarm indicative of a potential breach of said Ethernet CFM domain by said external port.

2. The method for securing an Ethernet CFM domain defined on a VLAN as recited in claim 1, wherein said external port is registered automatically with said VLAN via at least one of the Multiple VLAN Registration Protocol (MVRP) and the GARP (Generic Attribute Registration Protocol) VLAN Registration Protocol (GVRP).

3. The method for securing an Ethernet CFM domain defined on a VLAN as recited in claim 1, wherein said external port is manually registered with said VLAN.

4. The method for securing an Ethernet CFM domain defined on a VLAN as recited in claim 1, further comprising transmitting said alarm by said boundary MEP mode to a network management node associated with said Ethernet CFM domain.

5. The method for securing an Ethernet CFM domain defined on a VLAN as recited in claim 1, wherein said boundary MEP node is configured to operate as a customer-level domain node in said Ethernet CFM domain.

6. The method for securing an Ethernet CFM domain defined on a VLAN as recited in claim 1, wherein said boundary MEP node is configured to operate as a service provider-level domain node in said Ethernet CFM domain.

7. The method for securing an Ethernet CFM domain defined on a VLAN as recited in claim 1, wherein said boundary MEP node is configured to operate as an operator-level domain node in said Ethernet CFM domain.

8. The method for securing an Ethernet CFM domain defined on a VLAN as recited in claim 1, further comprising determining whether said bidirectional control frame flow is observed at said boundary MEP node within a predetermined period of time.

9. The method for securing an Ethernet CFM domain defined on a VLAN as recited in claim 1, further comprising preventing data traffic from flowing through said boundary MEP node with respect to said external port.

10. The method for securing an Ethernet CFM domain defined on a VLAN as recited in claim 1, wherein said bidirectional control frame flow involves transmission of Continuity Check (CC) frames emanating from said Ethernet CFM domain towards said external port and transmission of CC frames generated from outside said VLAN towards a MEP node disposed in said Ethernet CFM domain.

11. A system for securing an Ethernet Connectivity Fault Management (CFM) domain defined on a Virtual Local Area Network (VLAN), comprising:
a boundary Maintenance End Point (MEP) node of said Ethernet CFM domain, wherein said boundary MEP operating responsive to registering by an external port with said VLAN whereby said VLAN is extended to include said external port, monitors frame flow through said boundary MEP node in order to determine if bidirectional control frame flow is observed between said Ethernet CFM domain and extended portion of said VLAN including said external port, wherein bidirectional control frame flow includes control frame flow transmitted from said Ethernet CFM domain to the external port, and responsive to determining that there is no bidirectional control frame flow through said boundary MEP node, for generating an alarm indicative of a potential breach of said Ethernet CFM domain by said external port.

12. The system for securing an Ethernet CFM domain defined on a VLAN as recited in claim 11, wherein said external port is registered automatically with said VLAN via at least one of the Multiple VLAN Registration Protocol (MVRP) and the GARP (Generic Attribute Registration Protocol) VLAN Registration Protocol (GVRP).

13. The system for securing an Ethernet CFM domain defined on a VLAN as recited in claim 11, wherein said external port is manually registered with said VLAN.

14. The system for securing an Ethernet CFM domain defined on a VLAN as recited in claim 11, further comprising means for transmitting said alarm to a network management node associated with said Ethernet CFM domain.

15. The system for securing an Ethernet CFM domain defined on a VLAN as recited in claim 11, wherein said boundary MEP node is configured to operate as a customer-level domain node in said Ethernet CFM domain.

16. The system for securing an Ethernet CFM domain defined on a VLAN as recited in claim 11, wherein said boundary MEP node is configured to operate as a service provider-level domain node in said Ethernet CFM domain.

17. The system for securing an Ethernet CFM domain defined on a VLAN as recited in claim 11, wherein said boundary MEP node is configured to operate as an operator-level domain node in said Ethernet CFM domain.

18. The system for securing an Ethernet CFM domain defined on a VLAN as recited in claim 11, wherein said means for monitoring frame flow through said boundary MEP node is operable to determine whether said bidirectional control frame flow is observed at said boundary MEP node within a predetermined period of time.

19. The system for securing an Ethernet CFM domain defined on a VLAN as recited in claim 11, further comprising means for preventing data traffic from flowing through said boundary MEP node with respect to said external port.

20. The system for securing an Ethernet CFM domain defined on a VLAN as recited in claim 11, wherein said bidirectional control frame flow involves transmission of Continuity Check (CC) frames emanating from said Ethernet CFM domain towards said external port and transmission of CC frames generated from outside said VLAN towards a MEP node disposed in said Ethernet CFM domain.

21. A network node operable in an Ethernet Connectivity Fault Management (CFM) domain defined on a Virtual Local Area Network (VLAN), comprising:
a structure, operable responsive to registering by an external port with said VLAN whereby said VLAN is extended to include said external port, for determining if bidirectional control frame flow is observed at said network node, wherein bidirectional control frame flow includes control frame flow between the VLAN and the external port; and
a structure, operable responsive to determining that there is no bidirectional control frame flow between the VLAN and the external port through said network node, for generating an alarm indicative of a potential breach of said Ethernet CFM domain by said external port.

22. The network node as recited in claim 21, further comprising a structure for transmitting said alarm to a network management node associated with said Ethernet CFM domain.

23. The network node as recited in claim 21, further comprising a structure for determining if said bidirectional control frame flow is observed at said network node within a predetermined period of time.

24. The network node as recited in claim 21, further comprising a structure for preventing data traffic from flowing through said network node with respect to said external port.

* * * * *